(12) United States Patent
Ollmann

(10) Patent No.: US 8,549,625 B2
(45) Date of Patent: Oct. 1, 2013

(54) CLASSIFICATION OF UNWANTED OR MALICIOUS SOFTWARE THROUGH THE IDENTIFICATION OF ENCRYPTED DATA COMMUNICATION

(75) Inventor: Gunter D. Ollmann, Norcross, GA (US)

(73) Assignee: International Business Machines Corporation, Armonk, NY (US)

( * ) Notice: Subject to any disclaimer, the term of this patent is extended or adjusted under 35 U.S.C. 154(b) by 637 days.

(21) Appl. No.: 12/333,607

(22) Filed: Dec. 12, 2008

(65) Prior Publication Data

US 2010/0154032 A1    Jun. 17, 2010

(51) Int. Cl.
    *H04L 29/06* (2006.01)
(52) U.S. Cl.
    USPC ............ 726/22; 726/13; 726/14; 726/25
(58) Field of Classification Search
    USPC ....................... 726/22–25; 713/188
    See application file for complete search history.

(56) References Cited

U.S. PATENT DOCUMENTS

| | | | |
|---|---|---|---|
| 7,447,768 B2 * | 11/2008 | Kelly et al. | 709/224 |
| 7,624,444 B2 * | 11/2009 | Gupta et al. | 726/23 |
| 2002/0129140 A1 | 9/2002 | Peled et al. | |
| 2003/0159070 A1 | 8/2003 | Mayer et al. | |
| 2004/0034794 A1 * | 2/2004 | Mayer et al. | 713/200 |
| 2005/0055399 A1 * | 3/2005 | Savchuk | 709/203 |
| 2005/0166066 A1 | 7/2005 | Ahuja et al. | |
| 2005/0240991 A1 | 10/2005 | Dombkowski et al. | |
| 2006/0143710 A1 * | 6/2006 | Desai et al. | 726/23 |
| 2006/0156400 A1 * | 7/2006 | Shevchenko | 726/22 |
| 2006/0248575 A1 | 11/2006 | Levow et al. | |
| 2007/0055731 A1 | 3/2007 | Thibeault | |
| 2007/0083930 A1 | 4/2007 | Dumont et al. | |
| 2007/0106754 A1 | 5/2007 | Moore | |
| 2008/0141332 A1 * | 6/2008 | Treinen | 726/1 |
| 2008/0282080 A1 * | 11/2008 | Hyndman et al. | 713/150 |
| 2009/0150972 A1 * | 6/2009 | Moon et al. | 726/1 |

FOREIGN PATENT DOCUMENTS

| | | |
|---|---|---|
| EP | 1615373 A1 | 11/2006 |
| WO | 2007/038517 | 4/2007 |

* cited by examiner

*Primary Examiner* — Benjamin Lanier
(74) *Attorney, Agent, or Firm* — Yee & Associates, P.C.; Arthur J. Samodovitz

(57) ABSTRACT

A method for identifying malware or unauthorized software communications implemented within a computer infrastructure, the method including detecting an encrypted communication and determining identification data for the encrypted communication. Additionally, the method includes comparing the detected encrypted communication to at least one of a list of applications authorized for encrypted communications using the identification data and a list of authorized destinations of encrypted communications using the identification data. Furthermore, the method includes identifying the detected encrypted communication as an unauthorized encrypted communication in response to a determination that at least one of the detected encrypted communication is from an unauthorized application, which is not on the list of applications authorized for encrypted communications, based on the comparing and the detected encrypted communication is to an unauthorized destination, which is not on the list of authorized destinations.

13 Claims, 3 Drawing Sheets

CLASSIFICATION OF UNWANTED OR MALICIOUS SOFTWARE THROUGH THE IDENTIFICATION OF ENCRYPTED DATA COMMUNICATION

FIELD OF THE INVENTION

The present invention generally relates to identifying malicious activities, and more particularly, to a system and method for classification of unwanted or malicious software through the identification of encrypted data communication.

BACKGROUND

Malware, a portmanteau word from the words malicious and software, is software designed to infiltrate or damage a computer system without the owner's informed consent. The expression is a general term used by computer professionals to mean a variety of forms of hostile, intrusive, or annoying software or program code. Many computer users are unfamiliar with the term, and often use "computer virus" for all types of malware, including true viruses.

Software is considered malware based on the perceived intent of the creator rather than any particular features. Malware includes computer viruses, worms, trojan horses, most root kits, spyware, dishonest adware, crimeware and other malicious and unwanted software. Malware is not the same as defective software, that is, software which has a legitimate purpose but contains harmful bugs.

Many early infectious programs, including the first Internet Worm and a number of MS-DOS viruses, were written as experiments or pranks generally intended to be harmless or merely annoying rather than to cause serious damage to computers. However, since the rise of widespread broadband Internet access, malicious software has come to be designed for a profit motive, either more or less legal (forced advertising) or criminal. For instance, since 2003, the majority of widespread viruses and worms have been designed to take control of users' computers for black-market exploitation. Infected "zombie computers" are used to send email spam, to host contraband data, or to engage in distributed denial-of-service attacks as a form of extortion.

Another strictly for-profit category of malware has emerged in spyware, e.g., programs designed to monitor users' web browsing, display unsolicited advertisements, or redirect affiliate marketing revenues to the spyware creator. Spyware programs do not spread like viruses; they are generally installed by exploiting security holes or are packaged with user-installed software, such as peer-to-peer applications. It is not uncommon for spyware and advertising programs to install so many processes that the infected machine becomes unusable, defeating the intention of the attack.

The best-known types of malware, viruses and worms, are known for the manner in which they spread, rather than any other particular behavior. The term computer virus is used for a program which has infected some executable software and which causes that software, when run, to spread the virus to other executable software. Viruses may also contain a payload which performs other actions, often malicious. A worm, on the other hand, is a program which actively transmits itself over a network to infect other computers. A worm may also carry a payload.

During the 1980s and 1990s, it was usually taken for granted that malicious programs were created as a form of vandalism or prank (although some viruses were spread only to discourage users from illegal software exchange.) More recently, the greater share of malware programs have been written with a financial or profit motive in mind. This can be taken as the malware authors' choice to monetize their control over infected systems: to turn that control into a source of revenue.

Since 2003 or so, the most costly form of malware in terms of time and money spent in recovery has been the broad category known as spyware. Spyware programs are commercially produced for the purpose of gathering information about computer users, showing them pop-up ads, or altering web-browser behavior for the financial benefit of the spyware creator. For instance, some spyware programs redirect search engine results to paid advertisements. Others, often called "stealware" by the media, overwrite affiliate marketing codes so that revenue goes to the spyware creator rather than the intended recipient.

In order to coordinate the activity of many infected computers, attackers have used coordinating systems known as botnets. In a botnet scenario, the malware or malbot logs in to an Internet Relay Chat channel or other chat system. The attacker can then give instructions to all the infected systems simultaneously. Botnets can also be used to push upgraded malware to the infected systems, keeping them resistant to anti-virus software or other security measures.

As malware attacks become more frequent, attention has begun to shift from viruses and spyware protection, to malware protection, and programs have been developed to specifically combat them. Current anti-malware programs can combat malware in two ways. First, anti-malware programs can provide real time protection against the installation of malware software on a user's computer. This type of spyware protection works the same way as that of anti-virus protection in that the anti-malware software scans all incoming network data for malware software and blocks any threats it comes across. Secondly, anti-malware software programs can be used solely for detection and removal of malware software that has already been installed onto a user's computer. This type of malware protection is normally much easier to use and more popular. This type of anti-malware software scans the contents of the windows registry, operating system files, and installed programs on your computer and will provide a list of any threats found, allowing a user to choose what they want to delete and what they want to keep, or compare this list to a list of known malware components, removing files which match.

However, modern malware and other unauthorized software within an enterprise typically rely upon encrypted communications for either command and control or for identification of distribution nodes for peer-to-peer network applications (e.g., Skype®, file sharing, etc.). (Skype is a registered trademark of Skype Limited or other related companies, in the United States, other countries, or both.) In cryptography, encryption is the process of transforming information (referred to as plaintext) using an algorithm (called cipher) to make it unreadable to anyone except those possessing special knowledge, usually referred to as a key. The result of the process is encrypted information (in cryptography, referred to as ciphertext). In many contexts, the word encryption also implicitly refers to the reverse process, decryption (e.g., "software for encryption" can typically also perform decryption), to make the encrypted information readable again (i.e., to make it unencrypted).

Because these malware and other unauthorized software communications are encrypted, it is not typically possible to investigate the actual data being communicated. Thus, current technologies for malware detection that focus on signature matching of data within these protocols are insufficient from a protection perspective when the malware utilizes encrypted communications.

Thus, malware remains an ongoing problem for, e.g., computer users and/or service providers. Accordingly, there exists a need in the art to overcome the deficiencies and limitations described hereinabove.

SUMMARY

In a first aspect of the invention, a method for identifying malware or unauthorized software communications is implemented within a computer infrastructure. The method comprises detecting an encrypted communication and determining identification data for the encrypted communication. Additionally, the method comprises comparing the detected encrypted communication to at least one of a list of applications authorized for encrypted communications using the identification data and a list of authorized destinations of encrypted communications using the identification data. Furthermore, the method comprises identifying the detected encrypted communication as an unauthorized encrypted communication in response to a determination that at least one of the detected encrypted communication is from an unauthorized application, which is not on the list of applications authorized for encrypted communications, based on the comparing and the detected encrypted communication is to an unauthorized destination, which is not on the list of authorized destinations.

In another aspect of the invention, a computer system comprises a storage, a memory and a central processing unit. Additionally, the computer system comprises first program instructions to detect an encrypted communication and second program instructions to determine identification data for the encrypted communication. Additionally, the computer system comprises third program instructions to compare the encrypted communication to at least one of a list of applications authorized for encrypted communications and a list of authorized destinations of encrypted communications using the identification data. Further, the computer system comprises fourth program instructions to identify the encrypted communication as an unauthorized encrypted communication in response to a determination that the encrypted communication is at least one of from an unauthorized application, which is not on the list of applications authorized for encrypted communications, based on the comparing the encrypted communication to the list of applications authorized for encrypted communications and to an unauthorized destination, which is not on the list of authorized destinations for encrypted communications, based on the comparing the encrypted communication to the list of authorized destinations of encrypted communications. Furthermore, the first, second, third and fourth program instructions are stored in the storage for execution by the central processing unit via the memory.

In an additional aspect of the invention, a computer program product comprising a computer usable storage medium having readable program code embodied in the medium is provided. The computer program product includes at least one component operable to receive at least one of a list of applications authorized for encrypted communications and a list of authorized destinations of encrypted communications. Additionally, the computer infrastructure is operable to determine identification data for the encrypted communication. Furthermore, the computer infrastructure is operable to compare the detected encrypted communication to at least one of the list of applications authorized for encrypted communications and the list of authorized destinations of encrypted communications using the identification data. Furthermore, the computer infrastructure is operable to identify the detected encrypted communication as an unauthorized encrypted communication and block the detected encrypted communication in response to a determination that the detected encrypted communication is at least one of from an unauthorized application, which is not on the list of applications authorized for encrypted communications, based on the comparing and to an unauthorized destination, which is not on the list of authorized destinations for encrypted communications. Moreover, the computer infrastructure is operable to identify the detected encrypted communication as an authorized encrypted communication and allow the detected encrypted communication in response to a determination that the detected encrypted communication is from an authorized application, which is on the list of applications authorized for encrypted communications, based on the comparing and to an authorized destination, which is on the list of authorized destinations of encrypted communications, based on the comparing.

BRIEF DESCRIPTION OF THE SEVERAL VIEWS OF THE DRAWINGS

The present invention is described in the detailed description which follows, in reference to the noted plurality of drawings by way of non-limiting examples of exemplary embodiments of the present invention.

DETAILED DESCRIPTION

Figure 1:
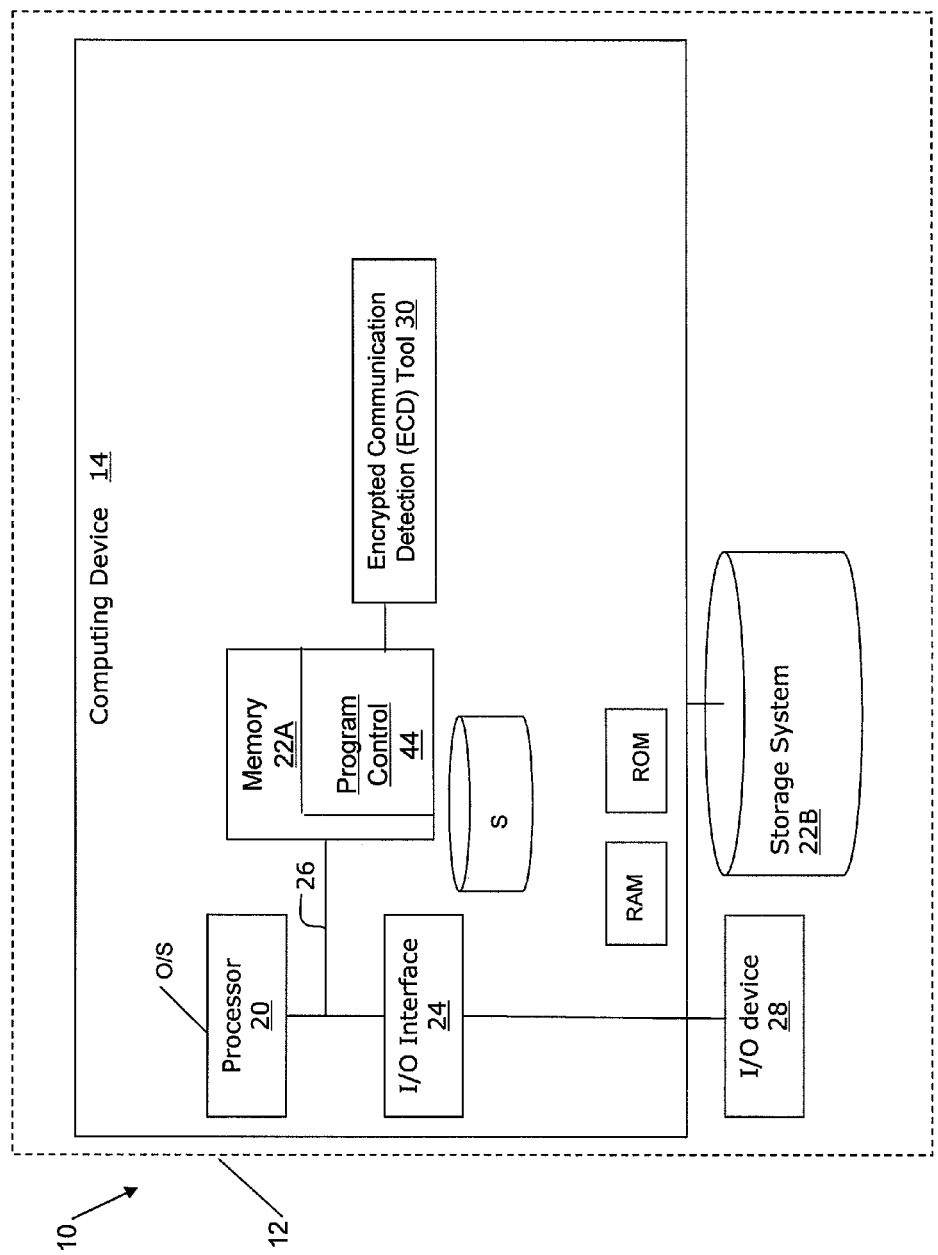
FIG. 1 shows an illustrative environment for implementing the steps in accordance with the invention.

The present invention generally relates to identifying malicious activities, and more particularly, to a system and method for classification of unwanted or malicious software through the identification of encrypted data communication. Malware and other unauthorized software within an enterprise (e.g., at the desktop level and/or server level) typically rely upon encrypted communications for either command and control, or for identification of distribution nodes for peer-to-peer network applications. That is, in order to remain undetected, malware uses encryption to conceal the contents of its communications. These encrypted communications may occur on any port, at any time, and for any length of time.

However, authorized applications deployed within an enterprise that do communicate in an encrypted manner are generally known to an organization. That is, an organization is aware of applications authorized for encrypted communications and identification data for the encrypted communications, e.g., the type of encrypted communications those authorized applications utilize (e.g., hash and/or RSA encryption), the source and destinations port numbers through which the communications are sent and received and/or the internet protocol (IP) address from which a communication originates or is sent from.

In accordance with aspects of the invention, unwanted encrypted communications associated with malware and unauthorized software deployments may be blocked by dynamically identifying any encrypted communications, and associating those encrypted communications with known or authorized applications. If any encrypted communication is not associated with the known or authorized applications, then the present invention is operable to identify the encrypted communication as associated with malware and/or unauthorized software. Moreover, the present invention is operable to block the encrypted communication as associated with malware and/or unauthorized software.

By implementing the present invention, it is possible to block unwanted encrypted communications associated with malware and unauthorized software deployments by dynamically identifying any encrypted communications, and associating those encrypted communications with known or authorized applications. Furthermore, by implementing the present invention, a system's susceptibility to malware and/or unauthorized software may be reduced. Implementing the present invention also allows for reduced resource expenditure in addressing malware and/or unauthorized software deployments.

System Environment

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following:

an electrical connection having one or more wires,
a portable computer diskette,
a hard disk,
a random access memory (RAM),
a read-only memory (ROM),
an erasable programmable read-only memory (EPROM or Flash memory),
an optical fiber,
a portable compact disc read-only memory (CDROM),
an optical storage device, and/or
a magnetic storage device.

In the context of this document, a computer-usable or computer-readable medium is any medium that stores the program for use by or in connection with the instruction execution system, apparatus, or device.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network. This may include, for example, a local area network (LAN) or a wide area network (WAN), or the connection may be made to an external computer (for example, through the Internet using an Internet Service Provider).

FIG. 1 shows an illustrative environment 10 for managing the processes in accordance with the invention. To this extent, the environment 10 includes a server or other computing system 12 that can perform the processes described herein. In particular, the server 12 includes a computing device 14. The computing device 14 can be resident on a network infrastructure or computing device of a third party service provider (any of which is generally represented in FIG. 1).

The computing device 14 includes an encrypted communication detection (ECD) tool 30. The ECD tool 30 is operable to receive a list of applications authorized for encrypted communications, detect encrypted communications, compare the detected encrypted communications to the list of applications authorized for encrypted communications, determine whether the detected encrypted communication is on the list of applications authorized for encrypted communications, allow the detected encrypted communication when the detected encrypted communication is on the list of applications authorized for encrypted communications, and block the detected encrypted communication when the detected encrypted communication is not on the list of applications authorized for encrypted communications, e.g., the processes described herein. The ECD tool 30 can be implemented as one or more program code in the program control 44 stored in memory 22A as separate or combined modules.

The computing device 14 also includes a processor 20, memory 22A, an I/O interface 24, and a bus 26. The memory 22A can include local memory employed during actual execution of program code, bulk storage, and cache memories which provide temporary storage of at least some program code in order to reduce the number of times code must be retrieved from bulk storage during execution. In addition, the computing device includes random access memory (RAM), a read-only memory (ROM), and a CPU.

The computing device 14 is in communication with the external I/O device/resource 28 and the storage system 22B. For example, the I/O device 28 can comprise any device that enables an individual to interact with the computing device 14 or any device that enables the computing device 14 to communicate with one or more other computing devices using any type of communications link. The external I/O device/resource 28 may be for example, a handheld device, PDA, handset, keyboard etc.

In general, the processor 20 executes computer program code (e.g., program control 44), which can be stored in the memory 22A and/or storage system 22B. Moreover, in accordance with aspects of the invention, the program control 44 having program code controls the ECD tool 30. While executing the computer program code, the processor 20 can read and/or write data to/from memory 22A, storage system 22B, and/or I/O interface 24. The program code executes the processes of the invention. The bus 26 provides a communications link between each of the components in the computing device 14.

The computing device 14 can comprise any general purpose computing article of manufacture capable of executing computer program code installed thereon (e.g., a personal computer, server, etc.). However, it is understood that the computing device 14 is only representative of various possible equivalent-computing devices that may perform the processes described herein. To this extent, in embodiments, the functionality provided by the computing device 14 can be implemented by a computing article of manufacture that includes any combination of general and/or specific purpose hardware and/or computer program code. In each embodiment, the program code and hardware can be created using standard programming and engineering techniques, respectively.

Similarly, the computing infrastructure 12 is only illustrative of various types of computer infrastructures for implementing the invention. For example, in embodiments, the server 12 comprises two or more computing devices (e.g., a server cluster) that communicate over any type of communications link, such as a network, a shared memory, or the like, to perform the process described herein. Further, while performing the processes described herein, one or more computing devices on the server 12 can communicate with one or more other computing devices external to the server 12 using any type of communications link. The communications link can comprise any combination of wired and/or wireless links; any combination of one or more types of networks (e.g., the Internet, a wide area network, a local area network, a virtual private network, etc.); and/or utilize any combination of transmission techniques and protocols.

In embodiments, the invention provides a business method that performs the steps of the invention on a subscription, advertising, and/or fee basis. That is, a service provider, such as a Solution Integrator, could offer to perform the processes described herein. In this case, the service provider can create, maintain, deploy, support, etc., the computer infrastructure that performs the process steps of the invention for one or more customers. These customers may be, for example, any business that uses technology. In return, the service provider can receive payment from the customer(s) under a subscription and/or fee agreement and/or the service provider can receive payment from the sale of advertising content to one or more third parties.

Encrypted Communication Detection Tool

Within a given organization, only specified applications may be allowed to encrypt (incoming and outgoing) communications, as may be defined by, e.g., a network administrator or system administrator. In accordance with aspects of the present invention, the encrypted communication detection (ECD) tool 30 detects encrypted connections and communications and compares the detected encrypted communications to a list of the specified applications, which are allowed to encrypt (incoming and outgoing) communications. If the ECD tool 30 detects an encrypted communication for an application which is not on the list of the specified applications (i.e., an unauthorized encrypted communication), the ECD tool 30 is operable to identify the unauthorized encrypted communication and, in embodiments, disallow or block the unauthorized encrypted communication.

According to further aspects of the invention, the ECD tool 30 may utilize one or more of a number of mathematical and analytical methods for identifying if a network communication is encrypted when packets are observed on the network, as is understood by those of ordinary skill in the art. By cataloging the identification data, e.g., details of the source, destination, and source and destination ports that these encrypted communications are taking place over, amongst other identification data, the ECD tool 30 is operable to discern authorized encrypted application communications and trusted networks from unknown and probable unauthorized malware application communications.

For example, the ECD tool 30 is operable to identify the identification data, e.g., a type of encryption (e.g., hash and/or RSA, amongst other types of encryptions) for the detected communication, the port numbers (e.g., source and destination port numbers) over which the detected communication is occurring and/or identification of the destination host, amongst other identification data. Additionally, in embodiments, applications may open, for example, secure HTTPS connections via a particular port number, which may impede a detection of an encryption type. Thus, in embodiments, the invention contemplates that the ECD tool 30 may utilize the port numbers (e.g., source and destination port numbers) over which the detected communication is occurring and/or identification of the destination host to identify unauthorized encrypted communications.

In embodiments, the ECD tool 30 may store the identification data, e.g., the cataloged details of the types of encryptions for the detected encrypted communications, the source and destination ports that these encrypted communications are taking place over and/or the destination host in a database, e.g., storage system 22B of FIG. 1. In embodiments, this database includes the cataloged details for the authorized encrypted communications, e.g., initially received by the ECD tool 30 from, for example, a network administrator or system administrator. Additionally, the database may include the identification data, e.g., the cataloged information, as detected by the ECD tool 30, for each detected encrypted communication, which has been identified as an authorized encrypted communication.

In accordance with aspects of the invention, the ECD tool 30 is operable to compare a detected encrypted communication with the list of authorized encrypted communications contained in the database, e.g., storage system 22B of FIG. 1 using the identification data. In embodiments, in performing the comparison of a detected encrypted communication with the list of authorized encrypted communications, the ECD tool 30 may utilize as identification data the detected encryption type, the source and/or destination for the detected encrypted communication, the source and/or destination port numbers for the detected encrypted communication, and/or a detected destination host.

When an encrypted unauthorized application is observed to be communicating, the ECD tool 30 will identify the unauthorized communication and, in embodiments, will disallow or block the unauthorized encrypted communication. Additionally, in embodiments, upon detecting an unauthorized encrypted communication, instead of automatically disallowing the unauthorized encrypted communication, the ECD tool 30 may trigger an alert to a user (e.g., to a network or server administrator and/or a desktop user). The user may then determine a proper course of action for the detected unauthorized encrypted communication, e.g., disallow the detected unauthorized encrypted communication or identify the application sending the detected encrypted communication as authorized (e.g., add the application sending the detected encrypted communication as to the list of applications authorized for encrypted communications).

Furthermore, in embodiments, in determining whether to disallow an encrypted connection from an application not known to allow encrypted connections, the ECD tool 30 may also consider whether an application (not on the list of the specified applications authorized for encrypted communications) is located on a trusted network, such as, for example, a same subnet. That is, if the application not known to allow encrypted connections is located on a trusted network, such as, for example, the same subnet, the application not known to allow encrypted connections may actually be a legitimate (e.g., non-malware) application. Thus, in embodiments, the ECD tool 30 may provide a user (e.g., a service provider or network administrator) with an indication that the application may be malware and allow the user to take appropriate action (e.g., disallow the application or indicate that the application should be on the list of the specified applications, which are allowed to encrypt (incoming and outgoing) communications. Additionally, in further embodiments, if the application not known to allow encrypted connections is located on a trusted network, the ECD tool 30 may automatically add the application to the list of applications authorized for encrypted communications.

According to further aspects of the invention, in embodiments, the ECD tool 30 is operable to utilize information about the destination of the encrypted traffic as an evaluation criteria. For example, if the ECD tool 30 identifies traffic as being encrypted (or probably encrypted) and the ECD tool 30 identifies the destination of that traffic as a host known to be part of a peer-to-peer network, e.g., inside a foreign country, that the organization does not normally deal with, the ECD tool 30 is operable to identify the traffic as unauthorized malware application communications.

Additionally, in embodiments, the ECD tool 30 is operable to compare the destination of the traffic to a list of potentially undesirable and/or unauthorized destinations (e.g., a netblock of internet protocol (IP) addresses belonging to a Turkish internet service provider (ISP) known to have fifty percent botnet infection rates), which may be stored in a database, e.g., the storage system 22B of FIG. 1. If the ECD tool 30 determines that the identified destination of the traffic is on the list of potentially undesirable destinations, the ECD tool 30 is operable to identify the traffic as unauthorized malware application communications.

According to further aspects of the invention, in addition to the list of applications authorized for encrypted communications and the list of potentially undesirable destinations being stored in the database, in embodiments, the ECD tool 30 is operable to store a list of applications unauthorized for encrypted communications and list of potentially desirable destinations. That is, in embodiments, the database may contain the list of applications authorized for encrypted communications and may also include a separate list of applications unauthorized for encrypted communications. Additionally, in embodiments, the database may contain the list of potentially undesirable destinations and may also include a list of potentially desirable destinations. Thus, with this exemplary embodiment, upon detecting a unauthorized encrypted communication (or unauthorized destination), the ECD tool 30 is operable to add identification data for the unauthorized encrypted communication to the database to, for example, aid in the detection of unauthorized encrypted communications.

Flow Diagrams

Figure 2:
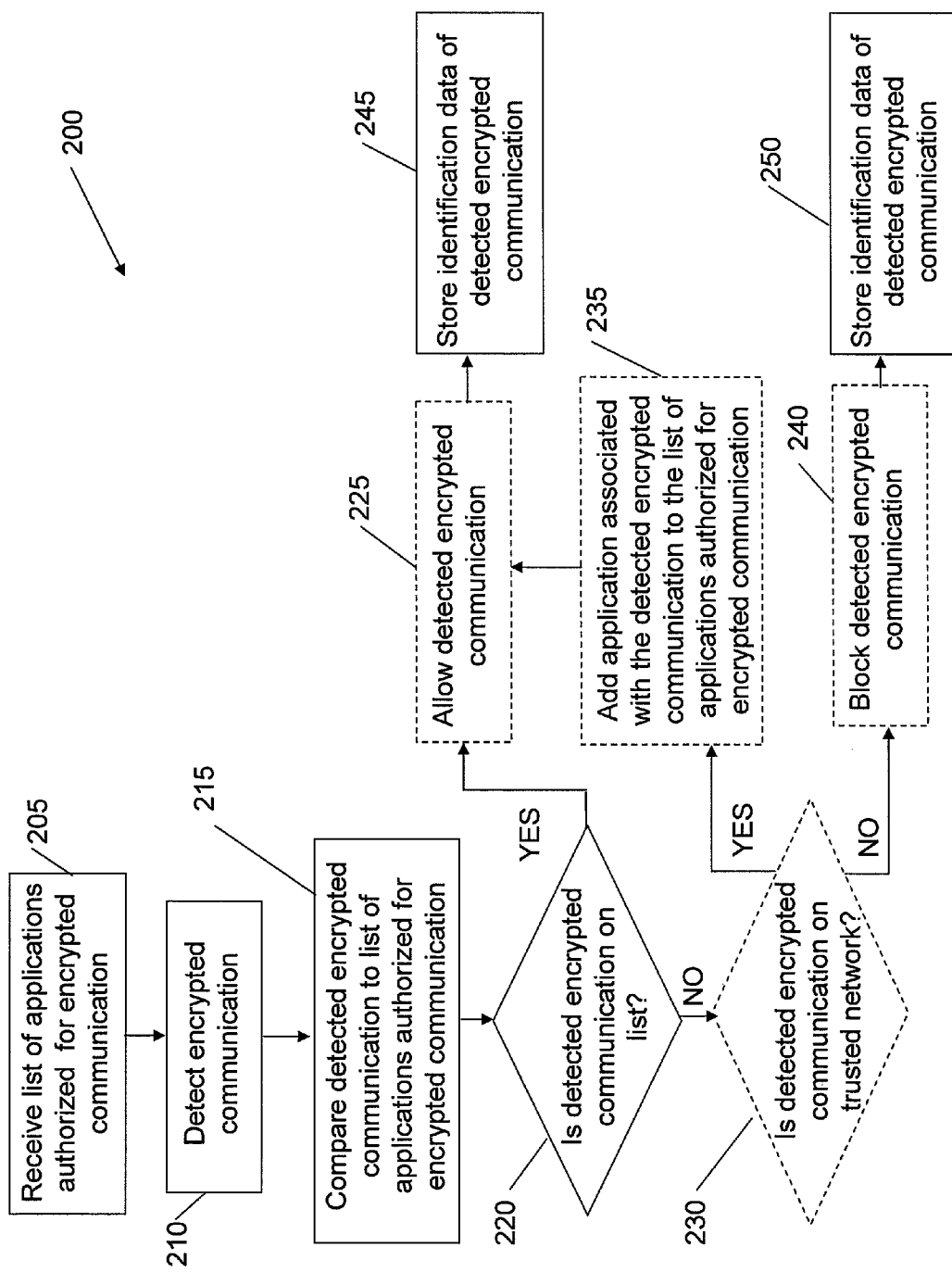
FIG. 2 shows an exemplary flow for classification of unwanted or malicious software through the identification of encrypted data communications in accordance with aspects of the invention.
Figure 3:
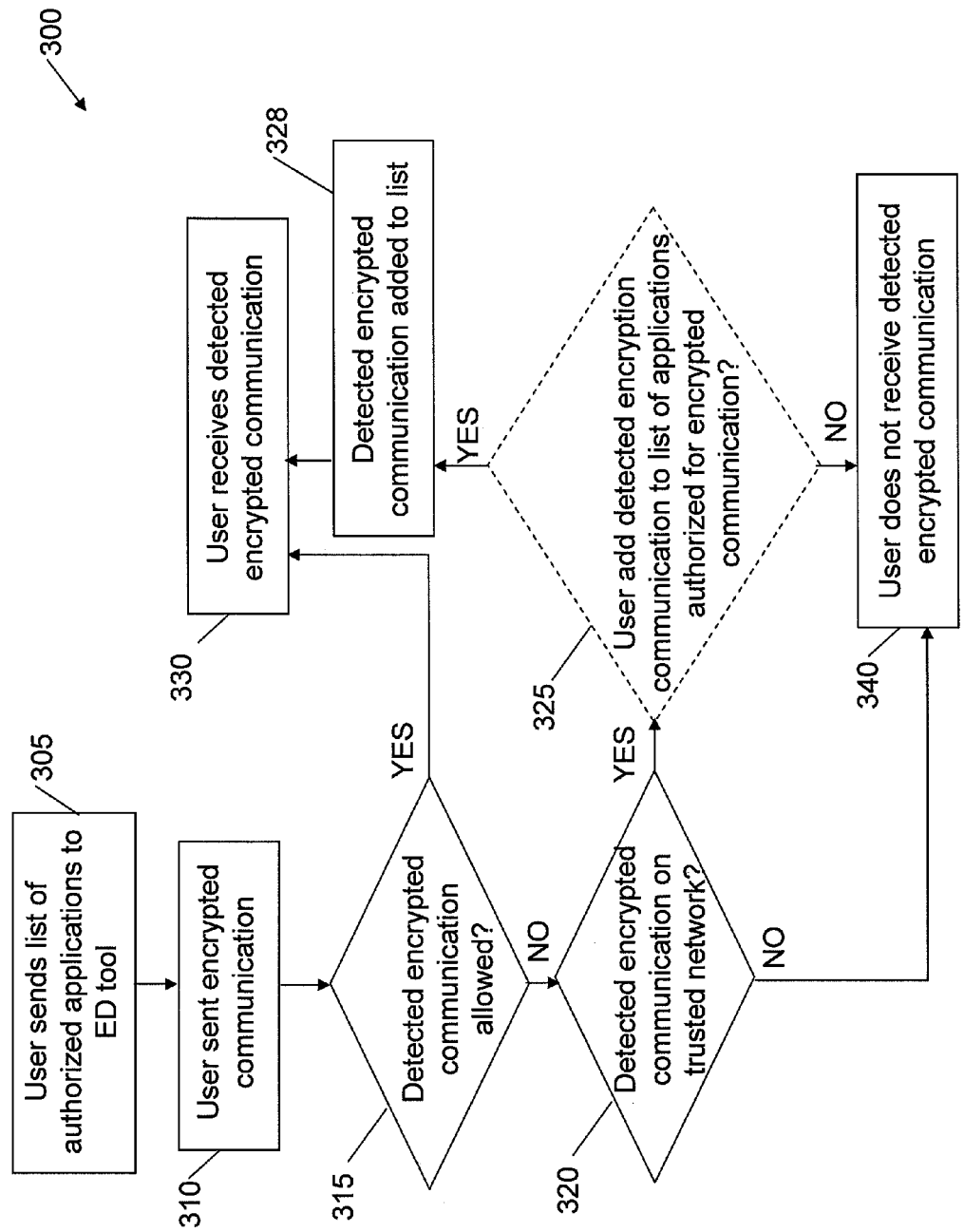
FIG. 3 shows an exemplary flow for classification of unwanted or malicious software through the identification of encrypted data communications in accordance with aspects of the invention.

FIGS. 2 and 3 show exemplary flows for performing aspects of the present invention. The steps of FIGS. 2 and 3 may be implemented in the environment of FIG. 1, for example. The flow diagrams may equally represent a high-level block diagrams of the invention. The flowcharts and/or block diagrams in FIGS. 2 and 3 illustrate the architecture, functionality, and operation of possible implementations of systems, methods and computer program products according to various embodiments of the present invention. In this regard, each block in the flowcharts or block diagrams may represent a module, segment, or portion of code, which comprises one or more executable instructions for implementing the specified logical function(s). It should also be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. Each block of each flowchart, and combinations of the flowchart illustrations can be implemented by special purpose hardware-based systems that perform the specified functions or acts, or combinations of special purpose hardware and computer instructions and/or software, as described above. Moreover, the steps of the flow diagrams may be implemented and executed from either a server, in a client server relationship, or they may run on a user workstation with operative information conveyed to the user workstation. In an embodiment, the software elements include firmware, resident software, microcode, etc.

Furthermore, the invention can take the form of a computer program product accessible from a computer-usable or computer-readable medium providing program code for use by or in connection with a computer or any instruction execution system. The software and/or computer program product can be implemented in the environment of FIG. 1. For the purposes of this description, a computer-usable or computer-readable medium is any apparatus that can store the program for use by or in connection with the instruction execution system, apparatus, or device. The medium can be electronic, magnetic, optical, electromagnetic, infrared, or a semiconductor system (or apparatus or device). Examples of a computer-readable storage medium include a semiconductor or solid state memory, magnetic tape, a removable computer diskette, a random access memory (RAM), a read-only memory (ROM), a rigid magnetic disk, and an optical disk. Current examples of optical disks include compact disk-read only memory (CD-ROM), compact disc-read/write (CD-R/W), and DVD.

FIG. 2 shows an exemplary flow 200 for performing aspects of the present invention. As shown in FIG. 2, at step 205, the ECD tool receives a list of applications authorized for encrypted communication from, e.g., a network administrator or user. In embodiments, the ECD tool may store the list of applications authorized for encrypted communication in a database, e.g., storage system 22B of FIG. 1.

At step 210, the ECD tool detects an encrypted communication. As discussed above, the ECD tool may detect encrypted communications utilizing one or more of a number of common mathematical and analytical methods for identifying if a network communication is encrypted when packets are observed on the network, as is understood by those of ordinary skill in the art.

At step 215, the ECD tool compares the detected encrypted communication to the list of applications authorized for encrypted communications. At step 220, the ECD tool determines whether the detected encrypted communication is on the list of applications authorized for encrypted communications. If, at step 220, the ECD tool determines that the detected encrypted communication is on the list of applications authorized for encrypted communications, then at step 225, the ECD tool allows the detected encrypted communication to proceed. At optional step 245, the ECD tool stores the identification data for the detected encryption communication in a database, e.g., the storage system of FIG. 1.

If, at step 220, the ECD tool determines that the detected encrypted communication is not on the list of applications authorized for encrypted communications, then the process proceeds to optional step 230.

At optional step 230, the ECD tool determines whether the detected encrypted communication is on a trusted network. If, at step 230, the ECD tool determines that the detected encrypted communication is on a trusted network, then, at optional step 235, the ECD tool adds the application associated with the detected encrypted communication to the list of applications authorized for encrypted communications. After optional step 235, the process proceeds to step 225, where the ECD tool allows the detected encrypted communication. If, at step 230, the ECD tool determines that the detected encrypted communication is not on a trusted network, then at step 240, the ECD tool blocks the detected encrypted communication. At optional step 250, the ECD tool stores the identification data for the detected encryption communication in a database, e.g., the storage system of FIG. 1.

As should be understood, the dashed lines of steps 230, 235, 245 and 250 indicate that, in embodiments, steps 230, 235, 245 and 250 are optional steps. Moreover, as should be understood, if the ECD tool does not perform optional steps 230 and 235, and, at step 220, the ECD tool determines that the detected encrypted communication is not on the list of applications authorized for encrypted communications, the process proceeds directly to step 240.

Additionally, while not shown in FIG. 2 but shown in FIG. 3 below, in further embodiments, upon the ECD tool determining that the detected encrypted communication is on a trusted network at step 230, the ECD tool may provide a user (e.g., a network administrator or local operator) with an option to perform step 235. That is, rather than the ECD tool automatically performing step 235, in embodiments, the ECD tool may provide a user with an option to perform step 235. If the ECD tool receives an indication not to perform step 235, then, with this exemplary embodiment, the process proceeds to step 240, where the ECD tool blocks the detected encrypted communication.

FIG. 3 shows an exemplary flow 300 for performing aspects of the present invention. As shown in FIG. 3, at step 305, a user, e.g., a local operator, a system administrator or a network administrator, sends a list of applications authorized for encrypted communications to the ECD tool. At step 310, the user is sent an encrypted communication. At step 315, as described above, the ECD tool determines whether the detected encrypted communication is on the list of applications authorized for encrypted communications. If, at step 315, the detected encrypted communication is allowed, then, at step 330, the user receives the encrypted communication.

If, at step 315, the detected encrypted communication is not allowed, then, at step 320, the ECD tool determines whether the detected encrypted communication is on a trusted network. If, at step 320, the ECD tool determines that the detected encrypted communication is not on a trusted network, then at step 340, the user does not receive the detected encryption communication. If, at step 320, the ECD tool determines that the detected encrypted communication is on a trusted network, then at optional step 325, the user determines whether to add the detected encrypted communication to the list of applications authorized for encrypted communications.

If, at optional step 325, the user determines to add the detected encrypted communication to the list of applications authorized for encrypted communications, at step 328, the detected encrypted communication is added to the list of applications authorized for encrypted communications, and at step 330, the user receives the detected encrypted communication. If, at optional step 325, the user determines to not add the detected encrypted communication to the list of applications authorized for encrypted communications, at step 340, the user does not receive the detected encrypted communication.

As should be understood, the dashed lines of step 325 indicate that, in embodiments, step 325 is an optional step. Moreover, as should be understood, if the user does not perform optional step 325, and, at step 320, the ECD tool determines that the detected encrypted communication on a trusted network, the process proceeds directly to step 328.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims, if applicable, are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principals of the invention and the practical application, and to enable others of ordinary skill in the art to understand the invention for various embodiments with various modifications as are suited to the particular use contemplated. Accordingly, while the invention has been described in terms of embodiments, those of skill in the art will recognize that the invention can be practiced with modifications and in the spirit and scope of the appended claims.

What is claimed is:

1. A method for identifying unauthorized encrypted communications, the method comprising:

a computer detecting an encrypted communication; **

the computer determining a source and destination of the encrypted communication;

the computer comparing the source of the detected encrypted communication to a predetermined list of applications authorized to send encrypted communications to the computer and the destination of the detected encrypted communication to a predetermined list of destinations authorized for encrypted communications, and if the source of the detected encrypted communication is on the predetermined list of authorized applications and the destination of the detected encrypted communication is on the predetermined list of destinations authorized for encrypted communications, the computer allowing the detected encrypted communication to proceed, and if the source of the detected encrypted communication is not on the predetermined list of authorized applications, the computer determining if the detected encrypted communication was sent from an application that is on a network trusted by the computer, and, if so, the computer adding the application on the trusted network to the predetermined list of applications authorized to send encrypted communications; and the computer subsequently receiving another encrypted communication from the application on the trusted network, and in response, the computer determining that a source of the other encrypted communication is the application on the trusted network and that the application on the trusted network is on the predetermined list of authorized applications, and, in response, if the destination of the other encrypted communication is on the predetermined list of destinations authorized for encrypted communications the computer allowing the other encrypted communication to proceed.

2. The method of claim 1, wherein if the source of the detected encrypted communication is not on the predetermined list of authorized applications, further comprising the step of blocking, by the computer, the detected encrypted communication.

3. The method of claim 1, wherein the source of the detected encrypted communication is on the predetermined list of authorized applications and the destination of the detected encrypted communication is on the predetermined list of destinations authorized for encrypted communications, and, in response, further comprising the step of processing, by the computer, the detected encrypted communication.

4. The method of claim 2 further comprising identifying, by the computer, the source of the detected encrypted communication as at least one of malware and an unauthorized software deployment if the source of the detected encrypted communication is not on the predetermined list of authorized applications.

5. The method of claim 4 further comprising:
sending, by the computer, an identification of the detected encrypted communication as an unauthorized encrypted communication to a user; and
receiving an instruction from the user to one of:
add an unauthorized application from which the detected encrypted communication was sent to the predetermined list of applications authorized to send encrypted communications and allow the detected encrypted communication; and
block the unauthorized encrypted communication.

6. A computer system for identifying unauthorized encrypted communications, the computer system comprising:
a computer-readable tangible storage device, a memory, and a central processing unit;
first program instructions to detect an encrypted communication;
second program instructions to determine a source and destination of the encrypted communication;
third program instructions to compare the source of the encrypted communication to a predetermined list of applications authorized to send encrypted communications and the destination of the detected encrypted communication to a predetermined list of destinations authorized for encrypted communications, and if the source of the detected encrypted communication is on the predetermined list of authorized applications and the destination of the detected encrypted communication is on the predetermined list of destinations authorized for encrypted communications, allow the detected encrypted communication to proceed, and if the source of the detected encrypted communication is not on the predetermined list of authorized applications, determine if the detected encrypted communication was sent from an application that is on a network trusted by the computer system, and if so, add the application on the trusted network to the list of applications authorized to send encrypted communications; and
fourth program instructions to subsequently receive another encrypted communication from the application on the trusted network, and in response, determine that a source of the other encrypted communication is the application on the trusted network and that the application on the trusted network is on the predetermined list of authorized applications, and in response, if the destination of the other encrypted communication is on the predetermined list of destinations authorized for encrypted communications allow the other encrypted communication to proceed, wherein the first program instructions, the second program instructions, the third program instructions, and the fourth program instructions are stored in the computer-readable tangible storage device for execution by the central processing unit via the memory.

7. The computer system of claim 6, wherein if the source of the detected encrypted communication is not on the predetermined list of authorized applications, further comprising fifth program instructions to block the detected encrypted communication, wherein the fifth program instructions are stored in the computer-readable tangible storage device for execution by the central processing unit via the memory.

8. The computer system of claim 6, wherein the source of the detected encrypted communication is on the predetermined list of authorized applications and the destination of the detected encrypted communication is on the predetermined list of destinations authorized for encrypted communications, and in response, further comprising sixth program instructions to:
process the detected encrypted communication, wherein the sixth program instructions are stored in the computer-readable tangible storage device for execution by the central processing unit via the memory.

9. The computer system of claim 6 further comprising seventh program instructions to receive the predetermined list of applications authorized to send encrypted communications and store the list of applications authorized to send the encrypted communications,
wherein the seventh program instructions are stored in the computer-readable tangible storage device for execution by the central processing unit via the memory.

10. A computer program product comprising a computer-readable tangible storage device having readable program code embodied in the computer-readable tangible storage device, the computer program product includes at least one component operable to:
receive a predetermined list of applications authorized to send encrypted communications;
detect an encrypted communication;
determine a source of the encrypted communication and a destination for the encrypted communication;
compare the source of the detected encrypted communication to the predetermined list of applications authorized to send the encrypted communications and the destination of the detected encrypted communication to a predetermined list of destinations authorized for encrypted communications, and if the source of the detected encrypted communication is on the predetermined list of authorized applications and the destination of the detected encrypted communication is on the predetermined list of destinations authorized for encrypted communications, allow the detected encrypted communication to proceed, and if the source of the detected encrypted communication is not on the predetermined list of authorized applications, determine if the detected encrypted communication was sent from an application that is on a network that is trusted, and if so, add the application on the trusted network to the predetermined list of applications authorized to send encrypted communications; and subsequently receive another encrypted communication from the application on the trusted network, and in response, determine that the source of the other encrypted communication is the application on the trusted network and that the application on the trusted network is on the predetermined list of authorized applications, and in response, if the destination of the other encrypted communication is on the predetermined list of destinations authorized for encrypted communications allow the other encrypted communication to proceed.

11. The method of claim 1, further comprising:
the computer comparing the destination to a predetermined list of destinations that are not authorized for encrypted communications, and if the destination of the detected encrypted communication is on the predetermined list of destinations that are not authorized for encrypted communications the computer blocking the detected encrypted communication.

12. The method of claim 11, wherein the predetermined list of destinations that are not authorized for encrypted communications include one of destinations in a foreign country that is not authorized for encrypted communications and destinations of an internet service provider that is not authorized for encrypted communications.

13. The method of claim 11, wherein the predetermined list of destinations that are not authorized for encrypted communications include unauthorized peer-to-peer network destinations.

* * * * *